(12) United States Patent
Hamagami et al.

(10) Patent No.: US 11,226,209 B2
(45) Date of Patent: Jan. 18, 2022

(54) INFORMATION PROCESSING SYSTEM, PROGRAM, AND CONTROL METHOD

(71) Applicant: TOYOTA JIDOSHA KABUSHIKI KAISHA, Toyota (JP)

(72) Inventors: Kana Hamagami, Nissin (JP); Takuya Maekawa, Nissin (JP); Yosuke Nakayama, Owariasahi (JP); Akitoshi Jikumaru, Nissin (JP); Tae Sugimura, Miyoshi (JP); Takao Hishikawa, Nagoya (JP); Shinichi Adachi, Takahama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 179 days.

(21) Appl. No.: 16/656,630

(22) Filed: Oct. 18, 2019

(65) Prior Publication Data
US 2020/0173801 A1 Jun. 4, 2020

(30) Foreign Application Priority Data
Dec. 3, 2018 (JP) .............................. JP2018-226450

(51) Int. Cl.
*G01C 21/34* (2006.01)
*G06K 9/00* (2006.01)
*B60W 40/09* (2012.01)

(52) U.S. Cl.
CPC ......... *G01C 21/3484* (2013.01); *B60W 40/09* (2013.01); *G01C 21/3492* (2013.01); *G06K 9/00791* (2013.01)

(58) Field of Classification Search
CPC ............ G01C 21/3484; G01C 21/3492; G01C 21/3461; G01C 21/3697; G01C 21/3415; B60W 40/09; G06K 9/00791
See application file for complete search history.

(56) References Cited

U.S. PATENT DOCUMENTS

| | | | |
|---|---|---|---|
| 7,512,487 B1 * | 3/2009 | Golding ............. | G01C 21/3492 701/424 |
| 10,274,328 B2 * | 4/2019 | Grochocki, Jr. ... | G01C 21/3423 |

(Continued)

FOREIGN PATENT DOCUMENTS

| | | |
|---|---|---|
| JP | 2003-14474 A | 1/2003 |
| JP | 2011-61263 A | 3/2011 |
| WO | WO 2008/038340 A1 | 4/2008 |

*Primary Examiner* — Luis A Martinez Borrero
(74) *Attorney, Agent, or Firm* — Oblon, McClelland, Maier & Neustadt, L.L.P.

(57) ABSTRACT

An information processing system includes a vehicle and an information processor that acquires information acquired by the vehicle from the vehicle. The vehicle acquires location information of the vehicle, acquires driving information of a driver of the vehicle, and provides route guidance on the basis of route guidance information that is generated in the information processor. The information processor stores traffic accident information, in which driving skill of a driver involved in a traffic accident occurred in the past and the number of the traffic accident at a point where the traffic accident has occurred are associated with location information of the point where the traffic accident has occurred, calculates the driving skill of the driver on the basis of the driving information, and generates the route guidance information on the basis of the calculated driving skill and the traffic accident information.

5 Claims, 5 Drawing Sheets

(56) References Cited

U.S. PATENT DOCUMENTS

| | | | |
|---|---|---|---|
| 2002/0082771 A1* | 6/2002 | Anderson | G01C 21/3484 701/423 |
| 2002/0120388 A1* | 8/2002 | Bullock | G08G 1/096888 701/117 |
| 2002/0120390 A1* | 8/2002 | Bullock | G08G 1/096838 701/117 |
| 2005/0159889 A1* | 7/2005 | Isaac | G01C 21/3484 701/414 |
| 2008/0255754 A1* | 10/2008 | Pinto | G08G 1/096844 701/119 |
| 2010/0106603 A1* | 4/2010 | Dey | G01C 21/3617 705/14.63 |
| 2010/0182140 A1* | 7/2010 | Kohno | G01C 21/3697 340/438 |
| 2010/0228427 A1* | 9/2010 | Anderson | G08G 1/166 701/31.4 |
| 2014/0162219 A1* | 6/2014 | Stankoulov | B60W 50/14 434/65 |
| 2017/0088174 A1* | 3/2017 | Inoue | B60T 8/17557 |
| 2017/0167885 A1* | 6/2017 | Adderly | G01C 21/3626 |
| 2018/0050698 A1* | 2/2018 | Polisson | B60W 30/182 |
| 2018/0051997 A1* | 2/2018 | Grochocki, Jr. | G01C 21/3415 |
| 2018/0058875 A1* | 3/2018 | Wan | G01C 21/3641 |
| 2018/0066952 A1* | 3/2018 | Bansal | G01C 21/3484 |
| 2018/0094943 A1* | 4/2018 | Grochocki, Jr. | G01C 21/3415 |
| 2019/0346276 A1* | 11/2019 | Jackson | G06Q 40/08 |
| 2020/0151742 A1* | 5/2020 | Hamagami | H04W 4/44 |
| 2020/0172111 A1* | 6/2020 | Hamagami | B60W 40/08 |
| 2020/0172114 A1* | 6/2020 | Hamagami | G06K 9/00791 |
| 2020/0175474 A1* | 6/2020 | Hamagami | B60W 40/09 |
| 2020/0211079 A1* | 7/2020 | Hamagami | G06K 9/00791 |
| 2020/0272829 A1* | 8/2020 | Hamagami | G06K 9/00832 |
| 2020/0272830 A1* | 8/2020 | Hamagami | G06Q 20/127 |
| 2020/0273121 A1* | 8/2020 | Hamagami | G06K 9/00791 |

* cited by examiner

| POINT P WHERE TRAFFIC ACCIDENT HAS OCCURRED | DRIVING SKILL | NUMBER OF TRAFFIC ACCIDENT |
|---|---|---|
| P1 | LOW | 10 |
| P1 | INTERMEDIATE | 5 |
| P1 | HIGH | 0 |
| P2 | LOW | 10 |
| P2 | INTERMEDIATE | 10 |
| P2 | HIGH | 10 |
| P3 | LOW | 1 |
| P3 | INTERMEDIATE | 1 |
| P3 | HIGH | 1 |
| ⋮ | ⋮ | ⋮ |

FIG. 5

INFORMATION PROCESSING SYSTEM, PROGRAM, AND CONTROL METHOD

INCORPORATION BY REFERENCE

The disclosure of Japanese Patent Application No. 2018-226450 filed on Dec. 3, 2018 including the specification, drawings and abstract is incorporated herein by reference in its entirety.

BACKGROUND

1. Technical Field

The present disclosure relates to an information processing system, a program, and a control method.

2. Description of Related Art

Conventionally, a technique of providing prediction information on a traffic accident to a driver of a vehicle to prevent the traffic accident has been known. For example, in Japanese Patent Application Publication No. 2003-014474 (JP 2003-014474 A), a vehicle navigation system is disclosed. Before a vehicle passes a point where the traffic accident has occurred in the past, the vehicle navigation system compares a traffic accident occurrence status at the time of the traffic accident in the past with a current vehicle travel status. Then, in the case where a status element that is common to both of the statuses exists, the vehicle navigation system outputs warning information, to which information on the traffic accident occurrence status is added, to the driver.

SUMMARY

There is a case where a cause of the traffic accident is associated with a driving skill of the driver. In such a case, for example, in order to reduce probability of occurrence of the traffic accident, in the case where the same route guidance that avoids the point where the traffic accident has occurred is uniformly provided regardless of the driving skill of the driver, it may be considered that such a route guidance is inappropriate for the driver with the specified driving skill.

A purpose of the present disclosure that has been made in view of such circumstances is to provide an information processing system, a program, and a control method capable of providing optimum route guidance to a driver while reducing probability of occurrence of a traffic accident.

An information processing system according to one aspect of the present disclosure is an information processing system that includes: a vehicle; and an information processor that acquires information acquired by the vehicle from the vehicle. The vehicle acquires location information of the vehicle and acquires driving information of a driver of the vehicle, so as to provide route guidance on the basis of route guidance information generated in the information processor. The information processor stores traffic accident information, in which driving skill of a driver involved in a traffic accident occurred in the past and the number of the traffic accident at a point where the traffic accident has occurred are associated with location information of the point, and calculates the driving skill of the driver on the basis of the driving information, so as to generate the route guidance information on the basis of the calculated driving skill and the traffic accident information.

A program according to another aspect of the present disclosure is a program that is operated in an information processing system including: a vehicle; and an information processor that acquires information acquired by the vehicle from the vehicle. The program makes the vehicle execute: a step of acquiring location information of the vehicle; a step of acquiring driving information of a driver of the vehicle; and a step of providing route guidance on the basis of route guidance information that is generated in the information processor. The program makes the information processor execute: a step of storing traffic accident information in which driving skill of a driver involved in a traffic accident and the number of the traffic accident at a point where the traffic accident has occurred in the past are associated with location information of the point; a step of calculating the driving skill of the driver on the basis of the driving information; and a step of generating the route guidance information on the basis of the calculated driving skill and the traffic accident information.

A control method according to yet another aspect of the present disclosure is a control method in an information processing system including: a vehicle; and an information processor that acquires information acquired by the vehicle from the vehicle. The control method includes, in the vehicle: a step of acquiring location information of the vehicle; and a step of acquiring driving information of the driver of the vehicle; a step of providing route guidance on the basis of route guidance information that is generated in the information processor. The control method includes, in the information processor: a step of storing traffic accident information in which driving skill of a driver involved in a traffic accident and the number of the traffic accident at a point where the traffic accident has occurred in the past are associated with location information of the point; a step of calculating the driving skill of the driver on the basis of the driving information; and a step of generating the route guidance information on the basis of the calculated driving skill and the traffic accident information.

According to the information processing system, the program, and the control method according to the aspects of the present disclosure, the optimum route guidance can be provided to the driver while reducing probability of occurrence of the traffic accident.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

A description will hereinafter be made on an embodiment of the present disclosure with reference to the accompanying drawings.

(Information Processing System)

Figure 1:
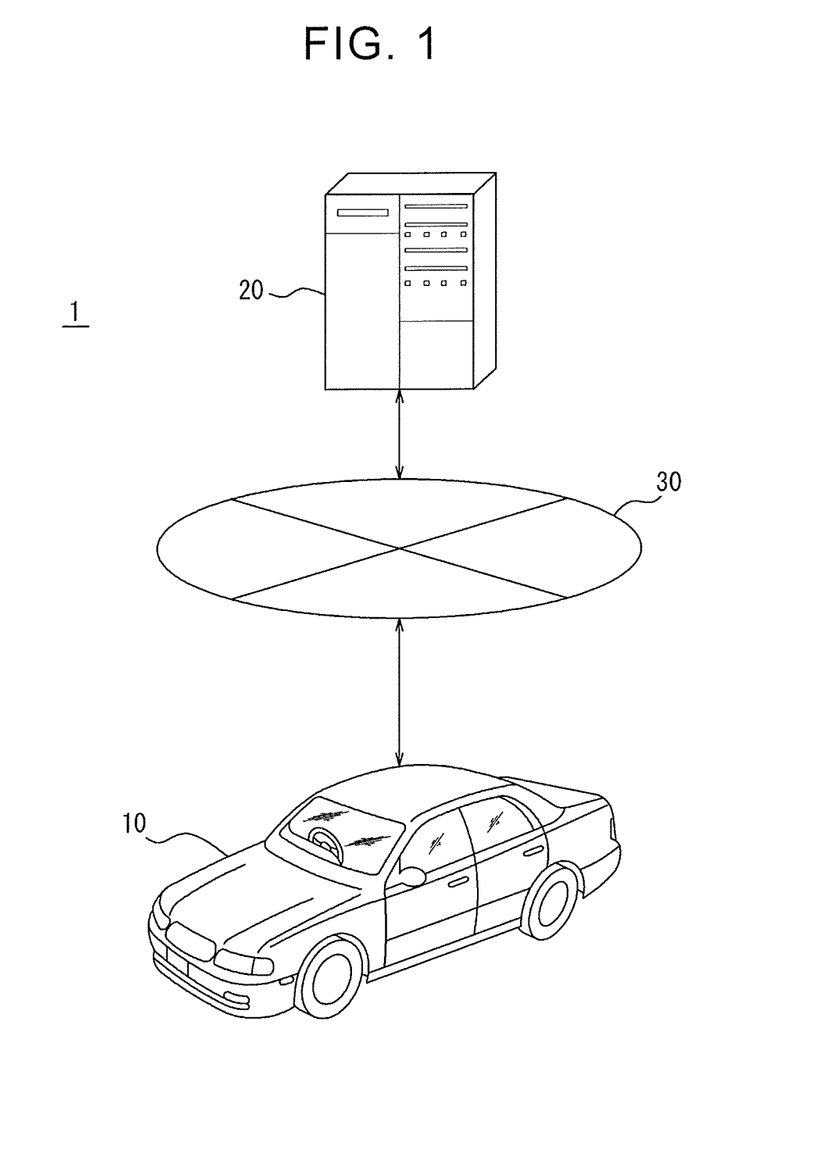
FIG. 1 is a view of a schematic configuration of an information processing system according to an embodiment of the present disclosure.

FIG. 1 is a view of a schematic configuration of an information processing system 1 according to an embodiment of the present disclosure. A description will primarily be made on a configuration and a function of the information processing system 1 according to the embodiment of the present disclosure with reference to FIG. 1.

The information processing system 1 includes a vehicle 10 and an information processor 20. The vehicle 10 and the information processor 20 are communicably connected to a network 30 that includes a mobile communication network, the Internet, and the like, for example. The vehicle 10 and the information processor 20 exchange information therebetween via the network 30.

The vehicle 10 is an automobile, for example. However, the vehicle 10 is not limited thereto, and may be any vehicle that a person can get on. The vehicle 10 is a vehicle driven by a driver. However, the vehicle 10 is not limited thereto, and may be an automated driving vehicle, for example. The automated driving includes levels 1 to 4 that are defined by the Society of Automotive Engineers (SAE), for example. However, the automated driving is not limited thereto, and may be defined arbitrarily. FIG. 1 only illustrates the single vehicle 10 for simplification of the illustration. However, the number of the vehicle 10 provided in the information processing system 1 may be one or more.

For example, the information processor 20 includes one server or plural servers that are mutually communicable. The information processor 20 is not limited thereto, and may be any general-purpose electronic equipment such as a personal computer (PC) or a smartphone, or may be another electronic equipment dedicated for the information processing system 1. For simplification of the description, FIG. 1 exemplifies only one server that constitutes the information processor 20.

As an overview of this embodiment, the information processor 20 acquires location information of the vehicle 10 and driving information of the driver of the vehicle 10, which are acquired by the vehicle 10, from the vehicle 10 via the network 30. Based on the driving information acquired from the vehicle 10, the information processor 20 calculates a driving skill of the driver of the vehicle 10. The information processor 20 stores traffic accident information in which location information of a point P where a traffic accident has occurred in the past is associated with a driving skill of a driver involved in the traffic accident and the number of the traffic accident at the point P. Based on the calculated driving skill of the driver of the vehicle 10 and the traffic accident information in the past, the information processor 20 generates route guidance information.

The route guidance information includes information on one or more candidate routes to a destination, for example. In the case where the plural candidate routes exist, the route guidance information may include information on one recommended route. Of the plural candidate routes, the recommended route may be a route with the shortest distance to the destination, for example, or may be a route with the earliest expected arrival time at the destination. The route guidance information is provided to occupants of the vehicle 10. The occupants of the vehicle 10 include the driver and a passenger(s) of the vehicle 10. The number of the occupant in the vehicle 10 may be one or plural. The vehicle 10 acquires the route guidance information, which is generated in the information processor 20, from the information processor 20 via the network 30. Based on the route guidance information acquired from the information processor 20, the vehicle 10 provides the route guidance.

Just as described, according to this embodiment, the information processing system 1 can provide the route guidance on the basis of the driving skill of the driver of the vehicle 10 and the traffic accident information in the past. For example, in regard to the traffic accident that has occurred at the point P in the past, in the case where the driving skill of the driver and the number of the traffic accident are correlated with each other, the information processing system 1 can provide the different route guidance according to the driving skill of the driver. On the contrary, for example, in regard to the traffic accident that has occurred at the point P in the past, in the case where the driving skill of the driver and the number of the traffic accident are not correlated with each other, the information processing system 1 can provide the same route guidance regardless of the driving skill of the driver. Accordingly, the information processing system 1 can provide the optimum route guidance to the driver while reducing probability of occurrence of the traffic accident.

Next, a detailed description will be made on each configuration of the information processing system 1.

(Vehicle)

Figure 2:
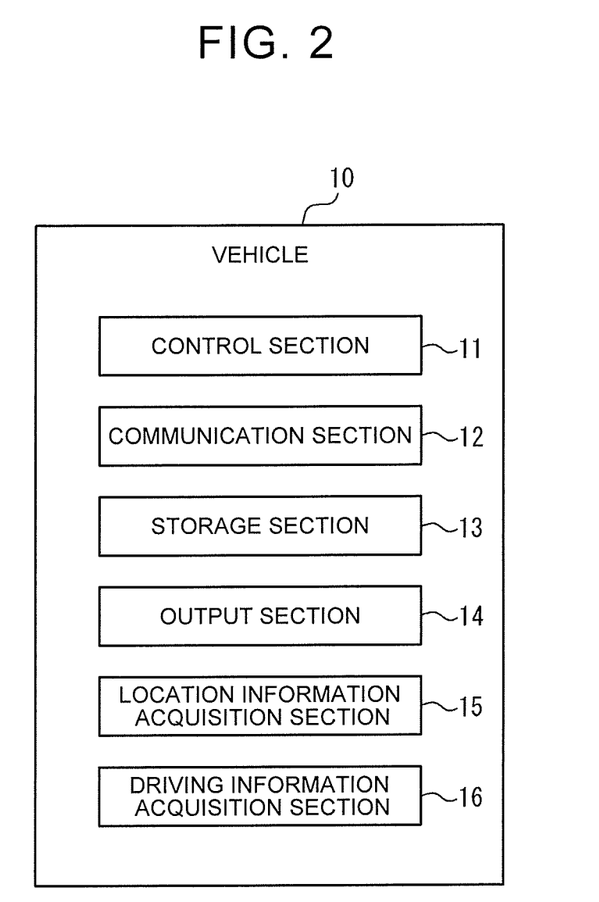
FIG. 2 is a block diagram of a schematic configuration of a vehicle.

FIG. 2 is a block diagram of a schematic configuration of the vehicle 10. As illustrated in FIG. 2, the vehicle 10 includes a control section 11, a communication section 12, a storage section 13, an output section 14, a location information acquisition section 15, and a driving information acquisition section 16. These constituent sections constituting the vehicle 10 are communicably connected to each other via an in-vehicle network such as a Controller Area Network (CAN) or a dedicated line.

The control section 11 has one or more processors. In this embodiment, the "processor" is a general-purpose processor or a dedicated processor specialized in particular processing. However, the "processor" is not limited thereto. An electronic control unit (ECU) that is mounted on the vehicle 10 may function as the control section 11. The control section 11 is connected to each of the constituent sections constituting the vehicle 10, for example, in the communicable manner, and controls overall operation of the vehicle 10. In this embodiment, for example, the control section 11 controls each of the acquisition sections to acquire various types of information. For example, the control section 11 controls the communication section 12 and transmits the various types of the acquired information to the information processor 20 via the network 30.

The communication section 12 includes a communication module that makes communication via the in-vehicle network or the dedicated line. The communication section 12 includes the communication module that is connected to the network 30. For example, the communication section 12 may include a communication module that is compatible with a mobile communication standard such as 4th Generation (4G) or 5th Generation (5G). For example, an in-vehicle communicator such as a data communication module (DCM) may function as the communication section 12. In this embodiment, the vehicle 10 is connected to the network 30 via the communication section 12.

The storage section 13 includes one or more units of memory. In this embodiment, "memory" is semiconductor memory, magnetic memory, optical memory, or the like, for example. However, the "memory" is not limited thereto. Each of the memory units provided in the storage section 13 may function as a main storage unit, an auxiliary storage unit, or cache memory, for example. The storage section 13 stores arbitrary information used for the operation of the vehicle 10. For example, the storage section 13 may store a system program, an application program, road traffic information, road map information, the various types of the information acquired by each of the acquisition sections of the vehicle 10, and the like. The information stored in the storage section 13 may be updatable on the basis of the information acquired from the network 30 via the communication section 12, for example.

Based on the route guidance information generated in the information processor 20, the output section 14 provides the route guidance. In this embodiment, the output section 14 includes a car navigation system. The output section 14 is not limited thereto, and may include any output device that influences at least one of visual perception and auditory perception of the occupant of the vehicle 10. The output section 14 may include any audio output device, which mainly influences the auditory perception of the occupant of the vehicle 10, other than the car navigation system, for example. The output section 14 may include any image output device, which mainly influences the visual perception of the occupant of the vehicle 10, other than the car navigation system, for example.

The location information acquisition section 15 acquires the location information of the vehicle 10. In this embodiment, the location information acquisition section 15 includes one or more receivers compatible with any satellite positioning system. For example, the location information acquisition section 15 includes a Global Positioning System (GPS) receiver. At this time, the location information acquisition section 15 acquires the location information of the vehicle 10 on the basis of a GPS signal. The location information includes longitude, latitude, altitude, a travel lane location, and the like, for example. The location information acquisition section 15 may constantly acquire the location information of the vehicle 10 or may periodically acquire the location information of the vehicle 10.

The configuration of the location information acquisition section 15 is not limited to the above contents. The location information acquisition section 15 may include a geomagnetic sensor, an angular acceleration sensor, or the like. At this time, the location information acquisition section 15 may acquire a direction that the vehicle 10 faces.

The driving information acquisition section 16 acquires the driving information of the driver of the vehicle 10. In this embodiment, the driving information acquisition section 16 includes at least one of a cabin camera that is installed in a cabin of the vehicle 10 and an outside camera that captures an image on the outside of the vehicle 10. The driving information acquisition section 16 acquires the driving information of the driver from at least one of an image captured by the cabin camera and a travel image of the vehicle 10 that is captured by the outside camera, for example. For example, the driving information includes at least one of facial expression, facial orientation, a line of sight, a blinking state, a gesture, driving duration, speed adjustment, travel lane maintenance, forward confirmation, rearward confirmation, lateral confirmation, and attributes such as age, sex, nationality, and race. The driving information acquisition section 16 may constantly acquire the driving information of the driver of the vehicle 10 or may periodically acquire the driving information of the driver of the vehicle 10.

The driving information acquisition section 16 may use a facial recognition technology, for example, to acquire the driving information from the image captured by the cabin camera. In addition to the above, the driving information acquisition section 16 may use any image recognition technology to acquire the driving information from the image captured by the cabin camera. Similarly, the driving information acquisition section 16 may use any image recognition technique to acquire the driving information from the travel image of the vehicle 10 captured by the outside camera.

The configuration of the driving information acquisition section 16 is not limited to the above contents. The driving information acquisition section 16 may include any image sensor other than the cabin camera and the outside camera. The driving information acquisition section 16 may include any other sensor that is connected to the CAN. The sensor may include any sensor such as light detection and ranging (LIDAR), a radar, sonar, a speed sensor, an acceleration sensor, a steering angle sensor, a pressure sensor, or a displacement sensor. The driving information acquisition section 16 may acquire the driving information of the driver of the vehicle 10 from output information that is output by the sensor, for example. At this time, the driving information may include information on at least one of an accelerator operation, a brake operation, a clutch operation, a blinker operation, a gearshift operation, a windshield wiper operation, a door mirror operation, a seat operation, an audio operation, a lighting operation, a steering operation, an air conditioning operation, and a seat belt operation.

The configuration of the driving information acquisition section 16 is not limited to the above contents. The driving information acquisition section 16 may include any sound sensor that is installed in the cabin of the vehicle 10 and is connected to the CAN. For example, the driving information acquisition section 16 may acquire the driving information from output information that is output by the sound sensor. At this time, the driving information may include sound information produced by the driver such as contents of conversation of the driver, voice produced through behavior of the driver expressing another kind of speech language, and sound produced through the behavior of the driver expressing another kind of sound.

The configuration of the driving information acquisition section 16 is not limited to the above contents. The driving information acquisition section 16 may include any biological sensor that is installed in the cabin of the vehicle 10 and is connected to the CAN. For example, the driving information acquisition section 16 may acquire the driving information from output information that is output by the biological sensor. At this time, the driving information may include a biological condition of the driver such as brainwaves, cerebral circulation, blood pressure, a blood sugar level, blood amino acids, a cardiac cycle, a pulse, a body temperature, a feeling temperature, a sense of hunger, and fatigue.

(Information Processor)

Figure 3:
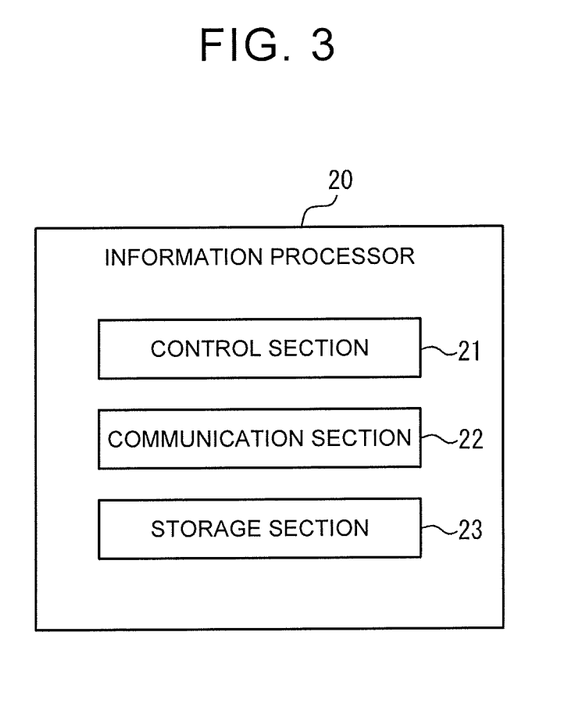
FIG. 3 is a block diagram of a schematic configuration of an information processor.

FIG. 3 is a block diagram of a schematic configuration of the information processor 20. As illustrated in FIG. 3, the information processor 20 includes a control section 21, a communication section 22, and a storage section 23.

The control section 21 includes one or more processors. The control section 21 is connected to each of the constituent sections constituting the information processor 20, and controls overall operation of the information processor 20. For example, the control section 21 controls the communication section 22 and acquires the various types of the information from the vehicle 10 via the network 30. For example, the control section 21 controls the storage section 23 and stores information, which is required for the operation of the information processing system 1, in the storage section 23.

The communication section 22 includes a communication module that is connected to the network 30. For example, the communication section 22 may include a communication module compatible with a wired local area network (LAN) standard. In this embodiment, the information processor 20 is connected to the network 30 via the communication section 22.

The storage section 23 includes one or more units of memory. Each of the memory units provided in the storage section 23 may function as a main storage unit, an auxiliary storage unit, or cache memory, for example. The storage section 23 stores arbitrary information used for the operation of the information processor 20. For example, the storage section 23 may store a system program, an application program, the road traffic information, the road map information, the various types of the information acquired by each of the acquisition sections of the vehicle 10, and the like. The information stored in the storage section 23 may be updatable on the basis of the information acquired from the network 30 via the communication section 22, for example.

The storage section 23 stores another type of the information required for the operation of the information processing system 1. For example, the storage section 23 stores the traffic accident information in which the location information of the point P, where the traffic accident has occurred in the past, is associated with the driving skill of the driver involved in the traffic accident and the number of the traffic accident at the point P. The traffic accident information may be managed as big data by aggregating all data, which is based on the various traffic accidents involving the plural vehicles 10 in the past, in the information processor 20, for example.

The traffic accident information is generated by the information processing system 1, for example, in a method as follows. When being notified of the occurrence of the traffic accident from the vehicle 10, the control section 21 associates the location information of the point P, where the traffic accident occurs, with the driving skill of the driver of the vehicle 10 and the number of the traffic accident at the point P. The number of the traffic accident at the point P may be calculated on the basis of the data on the various traffic accidents involving the plural vehicles 10 in the past, which is managed as the big data in the information processor 20, for example, or may be calculated on the basis of data on a similar traffic accident that is not included in the information processing system 1 and is appropriately acquired from another information processor.

The description has been made that the traffic accident information is generated by the information processing system 1. However, an applicable embodiment of the present disclosure is not limited thereto. The traffic accident information may be generated by another vehicle or another information processor that is not included in the information processing system 1. At this time, the control section 21 may receive the traffic accident information by the communication section 22 via the network 30, for example. The traffic accident information, which is received once, may be updatable constantly or may be updatable periodically on the basis of the information acquired from the network 30 via the communication section 22, for example.

Based on the driving information acquired by the driving information acquisition section 16 of the vehicle 10, the control section 21 calculates the driving skill of the driver of the vehicle 10 by machine learning, for example. In order to execute such calculation processing, the control section 21 may have any learning processing configuration. The driving skill may be calculated on the basis of any index. For example, the driving skill may be expressed by any of three levels of "low", "intermediate", and "high". The driving skill may not limited thereto and may be expressed by a numerical value from 0 to 100, for example. Just as described, the driving skill may be expressed by the numerical value within any numerical range. At this time, it is indicated that, as the value of the driving skill is increased, the driver of the vehicle 10 is in a higher driving technique level. On the contrary, it is indicated that, as the value of the driving skill is reduced, the driver of the vehicle 10 is in the lower driving technique level.

Based on the calculated driving skill of the driver of the vehicle 10 and the traffic accident information, the control section 21 generates the route guidance information. For example, in regard to the traffic accident information, in the case where the number of the traffic accident changes by the driving skill of the driver, the control section 21 may generate the different route guidance information according to the calculated driving skill of the driver of the vehicle 10. For example, in regard to the traffic accident information, in the case where the number of the traffic accident is not correlated with the driving skill of the driver, the control section 21 may generate the same route guidance information regardless of the calculated driving skill of the driver of the vehicle 10.

In principle, the information processing system 1 includes a route that passes the point P, where the traffic accident has occurred in the past, as the candidate route in the route guidance information by lowering a priority state thereof, or does not include such a route in the route guidance information. Depending on a case, the information processing system 1 may include the route that passes the point P as the candidate route or the recommended route in the route guidance information without lowering the priority thereof exceptionally.

Figure 4:
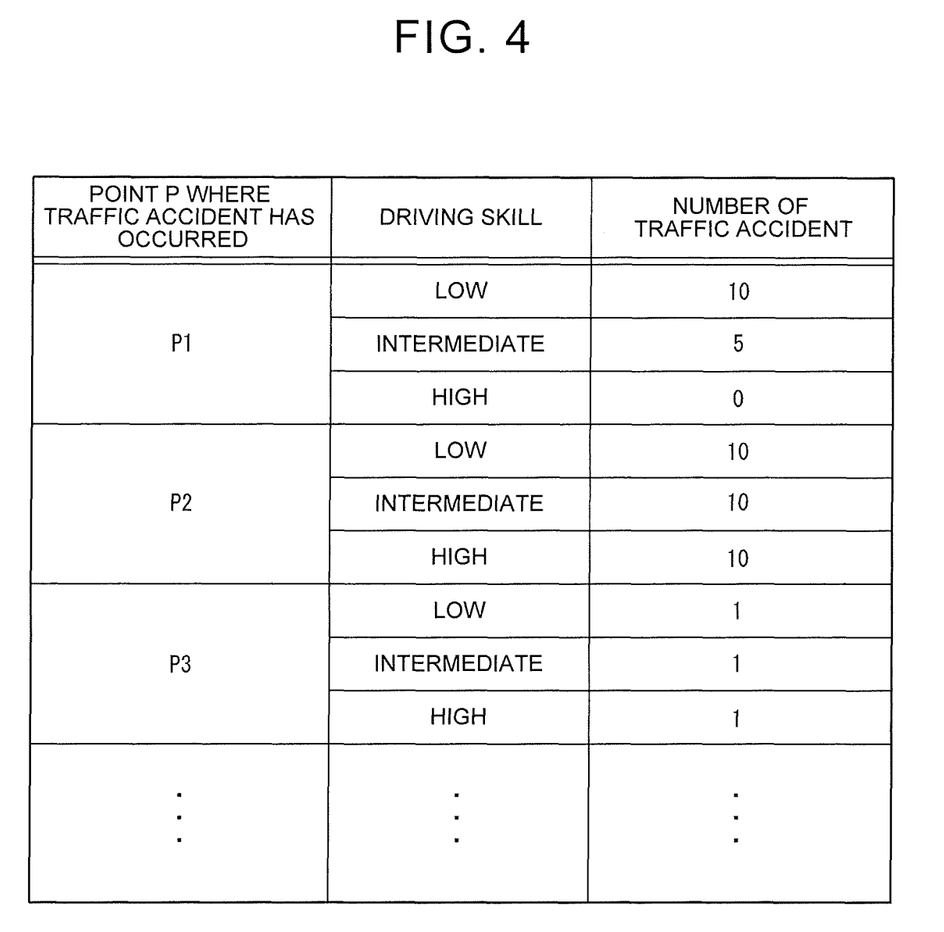
FIG. 4 is a table showing a specific example of traffic accident information that is stored in a storage section of the information processor.

FIG. 4 is a table showing a specific example of the traffic accident information that is stored in the storage section 23 of the information processor 20. A further specific description will be made on the route guidance information that is generated by the information processing system 1 with reference to FIG. 4. For simplification of the description, FIG. 4 only exemplifies representative points P1, P2, and P3 as the points P where the traffic accidents involving the plural vehicles 10 have occurred. However, an applicable embodiment of the present disclosure is not limited thereto. The points P where the traffic accidents have occurred may include one or more points other than the points P1, P2, and P3, or may include any one or two of the points P1, P2, and P3.

For example, in regard to the point P1 where the traffic accidents have occurred, the traffic accident information that is stored in the storage section 23 includes the number of the traffic accident according to the driving skill of the driver of the vehicle 10. More specifically, at the point P1, the number of the traffic accident is 10 when the driving skill is "low". At the point P1, the number of the traffic accident is 5 when the driving skill is "intermediate". At the point P1, the number of the traffic accident is 0 when the driving skill is "high". Just as described, at the point P1, the number of the traffic accident is increased as the driving skill of the driver of the vehicle 10 is lowered, for example. Accordingly, at the point P1, there is a tendency that the driving skill of the driver and the number of the traffic accident are correlated with each other and that the probability of the occurrence of the traffic accident is reduced as the driving skill is increased.

Hereinafter, a case where the route that passes the point P1 is also assumed as the candidate route to the destination set by the occupant of the vehicle 10 by using the car navigation system constituting the output section 14, for example, is considered. In the traffic accident information, in the case where the number of the traffic accident changes by the driving skill of the driver, the information processing system 1 generates the route guidance information that differs by the driving skill of the driver. The information processing system 1 displays the generated route guidance information in the output section 14, and provides the route guidance of the selected route on the basis of a determination operation accepted from the occupant of the vehicle 10.

When the driving skill of the driver of the vehicle 10, which is calculated by the control section 21, is "high", the corresponding number of the traffic accident in the traffic accident information is 0. Accordingly, with such a driving skill, the control section 21 determines that the probability of the occurrence of the traffic accident is extremely low even when the vehicle 10 passes the point P by driving of the corresponding driver. At this time, the control section 21 may include the route that passes the point P as the candidate route or the recommended route in the route guidance information without lowering the priority thereof exceptionally. For example, in the case where the route that passes the point P is the shortest route to the destination, the control section 21 may include such a route as the recommended route in the route guidance information.

When the driving skill of the driver of the vehicle 10, which is calculated by the control section 21, is "intermediate", the corresponding number of the traffic accident in the traffic accident information is 5. Accordingly, with such a driving skill, the control section 21 determines that the probability of the occurrence of the traffic accident is not so high even when the vehicle 10 passes the point P by driving of the corresponding driver. At this time, the control section 21 may include the route that passes the point P as the candidate route or the recommended route in the route guidance information by lowering the priority state thereof as in principle. However, for example, even in the case where the route that passes the point P is the shortest route to the destination, the control section 21 may include the different route from such a route as the recommended route in the route guidance information.

When the driving skill of the driver of the vehicle 10, which is calculated by the control section 21, is "low", the corresponding number of the traffic accident in the traffic accident information is 10. Accordingly, with such a driving skill, the control section 21 determines that the probability of the occurrence of the traffic accident is extremely high when the vehicle 10 passes the point P by driving of the corresponding driver. At this time, the control section 21 does not include the route that passes the point P1 in the route guidance information as in principle.

The description has been made above that the control section 21 determines the high or low probability of the occurrence of the traffic accident on the basis of the number of the traffic accident by the driving skill. However, an applicable embodiment of the present disclosure is not limited thereto. For example, the control section 21 may execute the determination processing by comparing a ratio of the number of the traffic accident by the driving skill to the total number of the traffic accident at the point P with a specified threshold, or may execute the determination processing by comparing the number of the traffic accident at the point P by the driving skill with the specified threshold. At this time, the control section 21 may determine that the probability of the occurrence of the traffic accident is high as the numerical value as a comparison target becomes larger than the specified threshold, or may determine that the probability of the occurrence of the traffic accident is low as the numerical value as the comparison target becomes smaller than the specified threshold.

For example, in regard to the point P2 where the traffic accidents have occurred, the traffic accident information stored in the storage section 23 includes the number of the traffic accident according to the driving skill of the driver of the vehicle 10. More specifically, at the point P2, the number of the traffic accident is 10 when the driving skill is "low". At the point P2, the number of the traffic accident is 10 when the driving skill is "intermediate". At the point P2, the number of the traffic accident is 10 when the driving skill is "high".

Just as described, at the point P2, as one example, the number of the traffic accident remains 10 regardless of the driving skill of the driver of the vehicle 10, and the total number of the traffic accident is 30. Accordingly, at the point P2, there is a tendency that the driving skill of the driver and the number of the traffic accident are not correlated with each other and that the probability of the occurrence of the traffic accident is high regardless of the driving skill.

For example, in regard to the point P3 where the traffic accidents have occurred, the traffic accident information stored in the storage section 23 includes the number of the traffic accident according to the driving skill of the driver of the vehicle 10. More specifically, at the point P3, the number of the traffic accidents is 1 when the driving skill is "low". At the point P3, the number of the traffic accidents is 1 when the driving skill is "intermediate". At the point P3, the number of the traffic accidents is 1 when the driving skill is "high".

Just as described, at the point P3, as one example, the number of the traffic accident remains 1 regardless of the driving skill of the driver of the vehicle 10, and the total number of the traffic accident is 3. Accordingly, at the point P3, there is a tendency that the driving skill of the driver and the number of the traffic accident are not correlated with each other and that the probability of the occurrence of the traffic accident is low regardless of the driving skill.

Hereinafter, a case where the route that passes the point P2 or the point P3 is also assumed as the candidate route to the destination set by the occupant of the vehicle 10 by using the car navigation system constituting the output section 14, for example, is considered. In the traffic accident information, in the case where the number of the traffic accident is not correlated with the driving skill of the driver, the information processing system 1 generates the same route guidance information regardless of the driving skill of the driver. For example, irrespective of the driving skill, the information processing system 1 compares the total numbers of the traffic accident at the point P2 and the point P3 to generate the route guidance information associated with each of the points.

The total value of the number of the traffic accidents is larger as 30 at the point P2 than 3 at the point P3. Thus, the control section and 21 determines that, at the point P2, the same large number of the traffic accident is associated with all the levels of the driving skill and that the probability of the occurrence of the traffic accident is high regardless of the driving skill of the driver who drives the vehicle 10. For all the drivers, the control section 21 does not include the route that passes the point P2 in the route guidance information as in principle.

On the contrary, the control section 21 determines that, at the point P3, the same small number of the traffic accident is associated with all the levels of the driving skill and that the probability of the occurrence of the traffic accident is low regardless of the driving skill of the driver who drives the vehicle 10. For all the drivers, the control section 21 may include, as the candidate route, the route that passes the point P3 in the route guidance information by lowering the priority state thereof as in principle. Meanwhile, even in the case where the route that passes the point P3 is the shortest route to the destination, for example, the control section 21 may include the different route from such a route as the recommended route in the route guidance information.

The description has been made above that the control section 21 determines the high or low probability of the occurrence of the traffic accident by comparing the total number of the traffic accident at each of the two points P2, P3. However, an applicable embodiment of the present disclosure is not limited thereto. For example, the control section 21 may execute the determination processing by comparing the total number of the traffic accident at the single point P with a specified threshold, or may execute the determination processing by comparing the number of the traffic accident at the point P by the driving skill with the specified threshold. At this time, the control section 21 may determine that the probability of the occurrence of the traffic accident is high as the numerical value as a comparison target becomes larger than the specified threshold, or may determine that the probability of the occurrence of the traffic accident is low as the numerical value as the comparison target becomes smaller than the specified threshold.

The route guidance information, which is generated per the point P or the driving skill by the information processing system 1, is not limited to have the above content. The route guidance information may have any content that matches the probability of the occurrence of the traffic accident determined by the control section 21. For example, the route guidance information relating to the point P1 may include the route that passes the point P1 as the candidate route by lowering the priority state thereof with respect to all the levels of the driving skill as in principle. At this time, the control section 21 may include the route that passes the point P1 as the candidate route by lowering the priority state thereof as the number of the traffic accident is increased. For example, the route guidance information relating to the point P2 may include the route that passes the point P2 as the candidate route by lowering the priority state thereof. At this time, the control section 21 may include the route that passes the point P2 as the candidate route by lowering the priority state thereof as the total number of the traffic accident is increased. For example, the route guidance information relating to the point P3 may not include the route that passes the point P3 for all the drivers.

(Operation Flow of Information Processing System)

Figure 5:
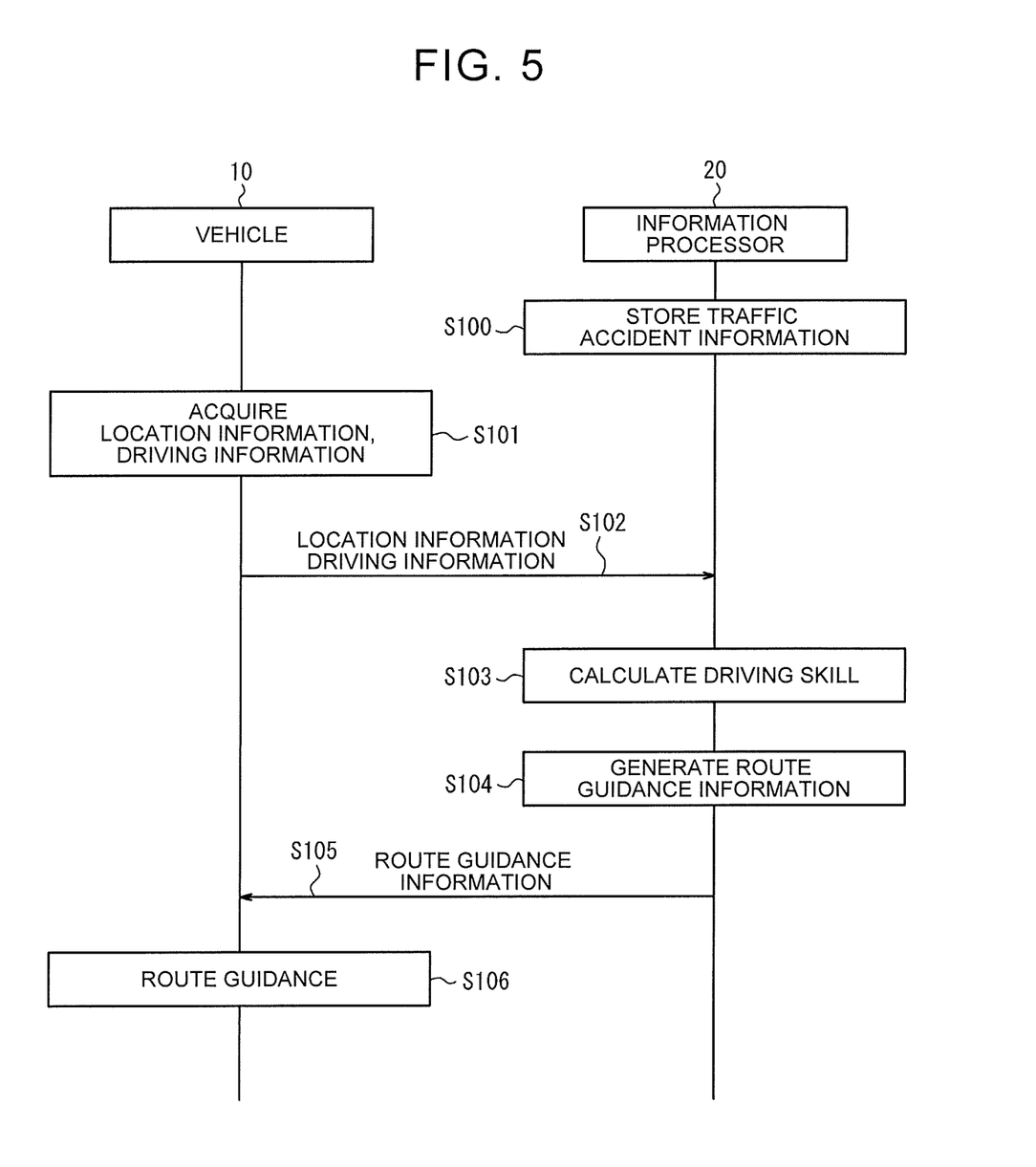
FIG. 5 is a sequence chart of an example of an operation flow of the information processing system.

FIG. 5 is a sequence chart of an example of an operation flow of the information processing system 1. A description will be made on the example of the operation flow of the information processing system 1 with reference to FIG. 5.

Step S100: the control section 21 of the information processor 20 stores the traffic accident information in the storage section 23. In the traffic accident information, the driving skill of the driver involved in the traffic accident and the number of the traffic accident at the point P are associated with the location information at the point P where the traffic accident has occurred in the past.

Step S101: the control section 11 of the vehicle 10 acquires the location information of the vehicle 10 by using the location information acquisition section 15. The control section 11 of the vehicle 10 acquires the driving information of the driver of the vehicle 10 by using the driving information acquisition section 16.

Step S102: the control section 11 of the vehicle 10 makes the communication section 12 transmit the location information of the vehicle 10 and the driving information of the driver, which are acquired in step S101, to the information processor 20. For example, the control section 21 of the information processor 20 may constantly acquire the location information of the vehicle 10 and the driving information of the driver from the communication section 12, or may appropriately acquire such information at specified timing.

Step S103: the control section 21 of the information processor 20 calculates the driving skill of the driver on the basis of the driving information of the driver, which is received in step S102.

Step S104: the control section 21 of the information processor 20 generates the route guidance information on the basis of the driving skill, which is calculated in step S103, and the traffic accident information, which is stored in step S100.

Step S105: the control section 21 of the information processor 20 makes the communication section 22 transmit the route guidance information, which is generated in step S104, to the vehicle 10.

Step S106: The control section 11 of the vehicle 10 provides the route guidance on the basis of the route guidance information, which is generated in step S104.

As it has been described so far, the information processing system 1 according to this embodiment can provide the optimum route guidance to the driver while reducing the probability of the occurrence of the traffic accident. The information processing system 1 generates the route guidance information on the basis of the calculated driving skill and the traffic accident information. In this way, the information processing system 1 can provide the specific and optimum route guidance in each case. For example, as described above, in the case where the probability of the occurrence of the traffic accident is high for the driver with the low driving skill at the point P1 and where the probability of the occurrence of the traffic accident is low for the driver with the high driving skill at the point P1, the information processing system 1 can appropriately propose the route that does not pass the point P1 or the route that passes the point P1 according to the driving skill.

In the case where the number of the traffic accident differs by the driving skill, the control section 21 generates the route guidance information that differs by the calculated driving skill. In this way, the information processing system 1 can provide the appropriate route guidance that matches the driving skill. For example, the information processing system 1 can avoid such a situation where the route that passes the point P1 is unnecessarily unprovided to the driver with the high driving skill when such a route is the shortest route to the destination. In addition, it is possible to avoid concentration of traffic on a particular route that avoids the point P where the traffic accident has occurred. The information processing system 1 according to this embodiment can avoid the concentration of the traffic while reducing the probability of the occurrence of the traffic accident.

In the case where the number of the traffic accident is not correlated with the driving skill, the information processing system 1 generates the same route guidance information regardless of the calculated driving skill. In this way, the information processing system 1 can simplify the generation of the route guidance information. Since the information processing system 1 can generate the uniform route guidance information regardless of the driving skill, the information processing system 1 can efficiently execute such processing.

The information processing system 1 can accurately acquire the driving information based on the visual information by acquiring the driving information from at least one of the image captured by the cabin camera and the travel image of the vehicle 10 captured by the outside camera. The information processing system 1 acquires the driving information of the driver from the output information that is output from any sensor capable of acquiring the driving information. In this way, the information processing system 1 can acquire various types of the driving information that cannot be acquired by the visual information. For example, the information processing system 1 can acquire information on minute operation, which cannot be acquired from the visual information, from the output information output by the sensor. For example, the information processing system 1 can acquire sound information on minute operation, which is produced by the driver and cannot be acquired from the visual information, from the output information output by the sound sensor. For example, the information processing system 1 can acquire the biological condition of the driver, which cannot be acquired from the visual information, from the output information output by the biological sensor.

The present disclosure has been described on the basis of the drawings and the embodiment. It should be noted that a person skilled in the art could easily make various modifications and corrections on the basis of the present disclosure. Therefore, it should also be noted that these modifications and corrections fall within the scope of the present disclosure. For example, functions and the like provided in each means, each step, or the like may be rearranged unless otherwise contradicted logically. In addition, the plurality of means, the plurality of the steps, or the like may be combined into one or may be divided.

For example, the description has been made in the above-described embodiment that each of the constituent sections of the vehicle 10 is mounted on the vehicle 10. However, it is possible to also adopt such a configuration that partial or entire processing operation executed by each of the constituent sections of the vehicle 10 can be executed by any electronic equipment such as the smartphone or the computer.

It is also possible to adopt such a configuration that the general-purpose electronic equipment such as the smartphone or the computer functions as each of the constituent sections of the vehicle 10 or the information processor 20 according to the above-described embodiment. For example, the program, in which the content of the processing for realizing each of the functions of the communication section 12 and the like according to the embodiment is written, is stored in memory of the electronic equipment. Then, a processor of the electronic equipment loads and executes the program. Therefore, this embodiment of the present disclosure can also be realized as the program that can be executed by the processor.

In the above-described embodiment, the description has been made that the vehicle 10 and the information processor 20 are connected for the mutual communication via the network 30. However, it is also possible to adopt such a configuration that the information processor 20 is mounted on the vehicle 10 itself and thus directly acquires the information, which is acquired by the vehicle 10, from the vehicle 10 without the intervention of the network 30. That is, it is also possible to adopt such a configuration that the vehicle 10 and the information processor 20 directly exchange the information without the intervention of the network 30.

At this time, similar to the above-described embodiment, the control section 11 and the control section 21 may be constructed of the different processors and may be provided separately in the vehicle 10 and the information processor 20. Differing from the above-described embodiment, the control section 11 and the control section 21 may be constructed of the same processor and may be configured as the single control section that is provided in both of the vehicle 10 and the information processor 20. That is, the single control section may realize the above-described processing operation of the vehicle 10 and the information processor 20.

In the above-described embodiment, the description has been made that the information processing system 1 calculates the driving skill of the driver on the basis of the driving information. However, the information that is calculated on the basis of the driving information is not limited to the driving skill of the driver. The information that is calculated on the basis of the driving information may be any index that reflects a driving technique of the driver, a driving tendency of the driver, and the like.

What is claimed is:

1. An information processing system comprising:
   a vehicle; and
   an information processor that acquires information acquired by the vehicle from the vehicle, wherein
   the vehicle acquires location information of the vehicle and acquires driving information of a driver of the vehicle, so as to provide route guidance on the basis of route guidance information generated in the information processor,
   the information processor stores traffic accident information, in which driving skill of a driver involved in a traffic accident occurred in a past and a number of the traffic accident at a point where the traffic accident has occurred are associated with location information of the point, and calculates the driving skill of the driver on the basis of the driving information, so as to generate the route guidance information on the basis of the calculated driving skill and the traffic accident information, and
   when the number of the traffic accident in the traffic accident information changes by the driving skill, the information processor generates the route guidance information that differs by the calculated driving skill.

2. The information processing system according to claim 1, wherein
   when the number of the traffic accident in the traffic accident information is not correlated h the driving skill, the information processor generates a same route guidance information regardless of the calculated driving skill.

3. The information processing system according to claim 1, wherein
   the vehicle includes at least one of a cabin camera that is installed in a cabin of the vehicle and an outside camera that captures an image on an outside of the vehicle, and acquires the driving information from at least one of an image captured by the cabin camera and a travel image of the vehicle captured by the outside camera.

4. A non-transitory computer-readable medium storing instructions that, when executed by one or more processors of an information processing system including a vehicle and an information processor acquiring information acquired by the vehicle from the vehicle, cause the information processing system to:

acquire location information of the vehicle;

acquire driving information of a driver of the vehicle;

provide route guidance on the basis of route guidance information that is generated in the information processor;

store traffic accident information which driving skill of a driver involved in a traffic accident occurred in a past and a number of the traffic accident at a point where the traffic accident has occurred are associated with location information of the point;

calculate the driving skill of the driver on the basis of the driving information;

generate the route guidance information on the basis of the calculated driving skill and the traffic accident information; and when the number of the traffic accident in the traffic accident information changes by the driving skill, generate the route guidance information that differs by the calculated driving skill.

5. A control method in an information processing system including a vehicle and an information processor acquiring information acquired by the vehicle from the vehicle, the control method comprising:

acquiring location information of the vehicle;

acquiring driving information of the driver of the vehicle;

providing route guidance on the basis of route guidance information that is generated in the information processor;

storing traffic accident information in which driving skill of a driver involved in a traffic accident occurred in a past and a number of the traffic accident at a point where the traffic accident has occurred are associated with location information of the point;

calculating the driving skill of the driver on the basis of the driving information;

generating the route guidance information on the basis of the calculated driving skill and the traffic accident information; and when the number of the traffic accident in the traffic accident information changes by the driving skill, generating the route guidance information that differs by the calculated driving skill.

* * * * *